United States Patent [19]

Zeytoonjian et al.

[11] Patent Number: 5,438,319

[45] Date of Patent: Aug. 1, 1995

[54] GOLF CART CONTROL AND MONITORING APPARATUS

[75] Inventors: Douglas Zeytoonjian, Boston, Mass.; Frederick Zeytoonjian, Sr., Somers, Conn.; Harold Kramer, Pittsfield; Paul Allen, North Adams, both of Mass.

[73] Assignee: Cart Watch, Inc., Enfield, Conn.

[21] Appl. No.: 82,030

[22] Filed: Jun. 24, 1993

[51] Int. Cl.$^6$ ............................................. G08B 13/14
[52] U.S. Cl. .................... 340/571; 340/332; 340/691; 340/988
[58] Field of Search ............... 340/571, 573, 326, 332, 340/323 R, 691, 988, 993; 377/5, 9, 17; 455/55.1, 67.7; 343/719; 280/33.994, DIG. 5; 307/64, 66

[56] References Cited

U.S. PATENT DOCUMENTS

| | | | |
|---|---|---|---|
| 3,934,175 | 1/1976 | Clark | 361/56 |
| 4,480,310 | 10/1984 | Alvarez | 364/450 |
| 4,656,476 | 4/1987 | Tavtigian | 340/993 |
| 4,766,847 | 8/1988 | Venczel et al. | 119/29 |
| 4,792,804 | 12/1988 | Rubechini | 340/561 X |
| 4,926,161 | 5/1990 | Cupp | 340/572 |
| 4,996,945 | 3/1991 | Dix, Jr. et al. | 119/29 |
| 5,044,634 | 9/1991 | Dudley | 340/323 R X |
| 5,053,768 | 10/1991 | Dix, Jr. | 340/988 |
| 5,097,416 | 3/1992 | Matthews | 340/323 R X |

Primary Examiner—John K. Peng
Assistant Examiner—Thomas J. Mullen, Jr.
Attorney, Agent, or Firm—Lorusso & Loud

[57] ABSTRACT

A golf cart control and monitoring apparatus, includes two antennas spaced from each other, two transmitters, two receivers, two alarms, an event counter, a time accumulator and a display for the events counted and the time accumulated. The two antennas are each disposed about a golf course restricted area and one antenna is disposed outside of the other. One transmitter transmits a first electromagnetic signal from one antenna which signal is received by the first receiver. The second transmitter transmits a second electromagnetic signal from the other antenna, which signal is received by the second receiver. The first alarm generates an alarm indicating that a golf cart is approaching a restricted area of a golf course in response to the first output from the first receiver. The second alarm generates another alarm, distinct from the first alarm, and an external alarm indicating that a golf cart has entered the restricted area in response to the second output from the second receiver. The event counter counts the number of times a golf cart enters into restricted areas and the time accumulator determines the cumulative amount of time the golf cart has been located in the restricted areas, wherein the accumulator begins to accumulate data upon receipt of the second output and stops data accumulation upon loss of the second output and receipt of the first output.

79 Claims, 4 Drawing Sheets

GOLF CART CONTROL AND MONITORING APPARATUS

FIELD OF INVENTION

This invention relates to a control and monitoring apparatus for golf carts and more particularly to an apparatus which monitors the movement of a golf cart with respect to golf course restricted or protected areas, which provides visual and/or auditory alerts and alarms so a golf cart operator can avoid such areas and which provides an event history of golf cart movement with respect to at least a portion of such areas.

BACKGROUND OF THE INVENTION

Maintenance of golf courses involves a significant amount of time and expense. This time and cost for maintenance is impacted when golf carts are driven onto areas of the golf course (e.g. the greens) where the traveling golf carts can cause damage. In addition to the cost and time associated with fixing the damaged grounds, the damage areas can inconvenience golfers, affect play, and in general make a golfer's use of the course less enjoyable.

There are two methods available for controlling the movement of golf carts while they are being operated on golf courses. One method involves providing some sort of warning to identify restricted areas of the golf course so the golf cart operator operator can avoid them. In the second method a predetermined course of action is dictated to the cart operator in the event the operator does not heed the warnings identifying restricted areas.

Under the first method golf courses have provided signs to identify restricted areas and to identify the paths on which the golf carts are supposed to travel. Alternatively, visual and auditory alarms have been provided on the golf carts to identify restricted areas and to indicate when the carts have intruded into the restricted area. Unfortunately, these schemes are not as effective as one would like.

The alternate scheme, disclosed in U.S. Pat. No. 4,656,476, uses an antenna/transmitter combination to identify the boundaries of the restricted areas; uses a receiver and signal processor to receive the transmitted signals and generate an output signal when the signal strength has exceeded a threshold; and provides visual/auditory alarms, responsive to the output signals, for the operators to determine where to drive the golf carts. Three visual alarms are used to indicate that the golf cart is approaching the outer boundary of a restricted area, to indicate that the cart is approaching a restricted area, and to indicate that the cart has entered a restricted area. An auditory alarm can be used to supplement the visual warnings.

This scheme, however, is only effective to protect restricted areas if the operator is willing to follow the visual and auditory queues. There is no provision made to hold operators accountable for their actions or lack thereof. Nor is there any provision made so golf course rangers patrolling the course can identify golf carts which are improperly parked or traveling on the golf course.

The second method of controlling assumes that some operators will not respond, for one reason or another, to the visual and/or auditory alarms. As such, this method dictates a predetermined course of action to be taken by a cart operator in the event the operator does not exit or avoid restricted areas per the warnings. The apparatus includes provisions to ensure that the operator follows the predetermined course of action.

The golf cart control system, disclosed in U.S. Pat. No. 5,053,768, provides both alarms to induce operator action and means for enforcing a predetermined course of action if the golf cart is not removed from a restricted area within a predetermined period of time. This system identifies the boundary of the restricted area by means of an single antenna and transmitter. When a signal above a predetermined threshold is received, the cart control system receiver package located on the golf cart, provides a visual warning (e.g., a single colored light) that the cart is entering a restricted area. This signal also starts a timer used to generate a second visual alarm if the golf cart has not exited the restricted area within a preset time.

If the operator fails to exit the restricted area within the preset time, the system has provisions for disabling the golf cart so it cannot be driven further in the forward direction in the protected area. Rather the golf cart is disabled so that it can only be driven in reverse or "backed out" of a restricted area. Disablement is accomplished by interconnecting the golf cart's drive with the cart control system. Disabling of the cart along with prespecifying the cart's direction of travel has certain short comings.

Since golf courses are not known for being flat, especially around the greens, it is quite possible for the cart to be going down an inclined section when the power is cut off. If the operator is not paying attention or is unaware that they have entered a restricted area (e.g., the alarm light has burned out), it is possible for the operator to become unnecessarily surprised or even injured (e.g., bump head) when the power is cut off and the vehicle comes to a sudden stop. Also when the cart is being backed out, the cart's operation could damage the turf or grass on the inclined section if it is wet.

This system contains no features for identifying nonconforming operators to golf course representatives (e.g., course rangers) during or after a game (i.e., no means for holding operators accountable for their actions). Rather, as indicated above, after receipt of the initial signal the cart is disabled upon the expiration of a predetermined amount of time. Thus, there is no way of determining if a cart operator ever violated the course rules concerning restricted areas during the time of play.

If an operator is not familiar with the disabling function or does not believe a restricted area had been entered, the operator may incorrectly conclude that the cart has had a power or transmission failure. The delay in resolving the reason for the golf cart's failure can impact or delay the play of other golfers, as well as annoy the operator. The operator could also become annoyed because the cart has become disabled and the operator is being forced to back-up the golf cart. Since golf like many games is part mental attitude, a golfer is quite likely to blame a bad hole or bad game on the problems with the cart. While protecting restricted areas is important, annoying golfers or interfering with the game of other golfers is not necessarily in the best interests of the golf course.

As a practical matter, the predetermined time period is on the order of about 2 seconds to assure that a golf cart does not make a large incursion into a restricted area (i.e., a golf cart traveling at 10 mph will traverse about 30 feet or 10 yards in 2 seconds). Because of the restrictive turn radius of golf carts, it is quite likely that the predetermined time period will expire before the cart can be turned around to exit the area. Thus, operators who turn their cart around and are exiting in compliance with the first warning will be forced to back-up out of the restricted area. This would happen even if driving forward would be the fastest and best way to exit. The likelihood of the time expiring before exiting becomes greater for operators who are moving at speeds slower than that assumed for determining the preset time period.

Disabling the cart also involves interfacing and interconnecting the cart control system with the controls and drive system for the golf cart. This increases the complexity of the cart control system and creates another failure mode for the cart. Since it is a common practice for golf courses to rent their golf carts, it is quite possible that such modifications to disable a cart would not be allowed by the cart owner; could only be done by the cart owner at the golf course's expense; or could involve additional charges from the owner to return the cart back to its as rented condition (e.g., repair cart). These added costs will likely exceed the typical rental charges, especially for daily rentals. Alternatively the golf course would have to purchase carts in lieu of renting them.

Rental carts are a concern because they are usually obtained when a golf course is anticipating a large number of guests for special events such as tournaments. Damage to restricted areas is more likely to occur at these times because the guests are not familiar with course rules and the areas of the course to be avoided. As such, rental cart usage and the potential for damage must be addressed.

Other systems involving golf cart control or locating a golf cart with respect to some feature of the golf course are disclosed in U.S. Pat. Nos. 4,480,310 and 4,926,161.

Therefore, it is an object of the present invention to provide a golf cart control and monitoring apparatus that monitors golf cart usage so cart operators who intrude into restricted/protected areas of a golf course can be identified and so these operators can be held accountable for their actions after and/or during a game.

It is a further object of the present invention to provide an apparatus that does not involve controlling the operation of a golf cart to prevent intrusion or further intrusion into a restricted area (e.g., disabling the cart).

Another object of the present invention is to provide an apparatus that provides both visual and auditory alarms/signals to a golf cart operator to identify restricted areas so the operator will not intrude into these areas.

It is yet a further object of the present invention to provide an apparatus that makes decisions based on cart location with respect to the restricted area.

It is yet another object of the present invention to provide an apparatus that permits course personnel to readily identify golf carts that are located in restricted areas.

SUMMARY OF THE INVENTION

This invention features a golf cart control and monitoring apparatus that monitors golf cart usage with respect to golf course restricted areas. The apparatus provides visual and auditory alarms to cart operators advising them of restricted areas so that the operators can avoid these areas. The apparatus also includes provisions so that cart operators who intrude into restricted/protected areas of a golf course can be identified and so these operators can be held accountable for their actions after and/or during a game.

The golf cart control and monitoring apparatus of the present invention includes two antennas each disposed about a restricted area, a transmitter means, a receiver means, first and second alarm means, and an event log means. The first and second antennas are spaced from each other, where the first antenna is disposed outside of the second antenna. The transmitter means transmits two different electromagnetic signals, a first signal to the first antenna and a second signal to the second antenna. The receiver means receives the first and second electromagnetic signals and provides first and second outputs representative thereof.

A first alarm means, responsive to the first output from said receiver means, generates a first alarm indicating that a golf cart is approaching a restricted area of a golf course. The second alarm means, responsive to the second output from said receiver means, generates a second alarm indicating that a golf cart has entered the restricted area. The second alarm means also generates an alarm that is distinct from that generated by the first alarm means. The event log means, responsive to both the first and second outputs, generates a cumulative historical log of how many times and for how long a golf cart has been located within the restricted area. The event log means, the receiver means and the first and second alarm means are disposed on the golf cart.

In a preferred embodiment the event log means begins to accumulate data upon receipt of said second output signal and terminates data accumulation upon loss of said first output and receipt of said first output. The event log means may include an event counter that counts each time the golf cart has entered into restricted areas. Also, the event log means may include a time accumulation means for determining the cumulative amount of time the golf cart has been located in restricted areas. Displays may be provided, responsive to the event counter and the time accumulation means, to display the total number of entries into and the cumulative time in these restricted areas.

The control and monitoring apparatus may include an external visual warning means, responsive to the second output signal, for generating a visual signal to course representatives identifying golf carts that are located in restricted areas.

The receiver means may include two receivers for receiving the first and second electromagnetic signals and a signal processing and sealing means. The transmitter means may include two transmitters for generating the first and second electromagnetic signals.

DESCRIPTION OF THE PREFERRED EMBODIMENT

Figure 1A:
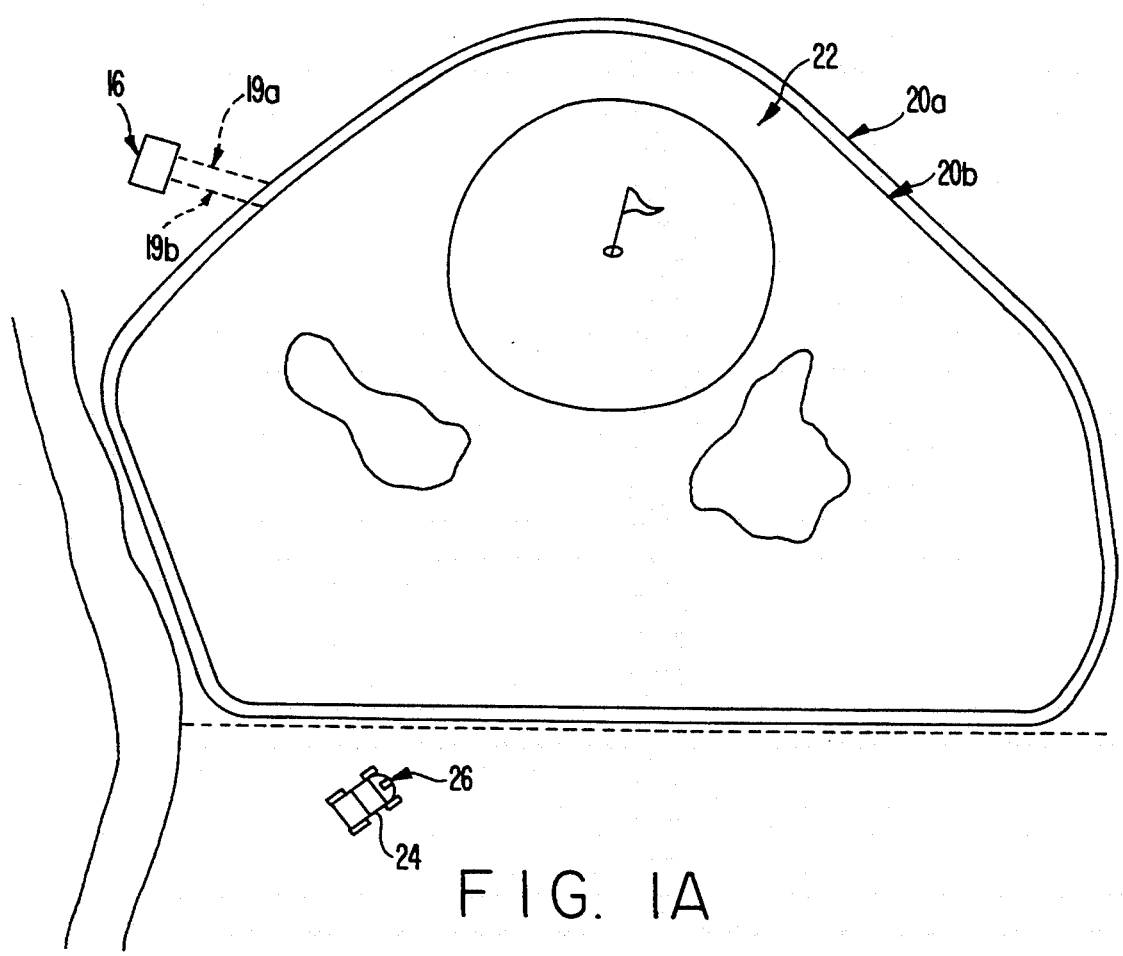
FIG. 1A is a plan view of a restricted golf course area.

There are a number of areas around a golf course designated by course representatives (e.g., the course supervisor) where golf carts are excluded because a traveling cart can damage these areas. These areas include tees, low lying wet areas, designated practice areas, the putting greens, and the areas contiguous to the putting greens. There is shown in FIG. 1A, a plan view of a restricted area 22 about a green on a golf course. The restricted area 22 includes the sand traps fronting the green, the green and the part of the fairway contiguous to the green.

Figure 2:
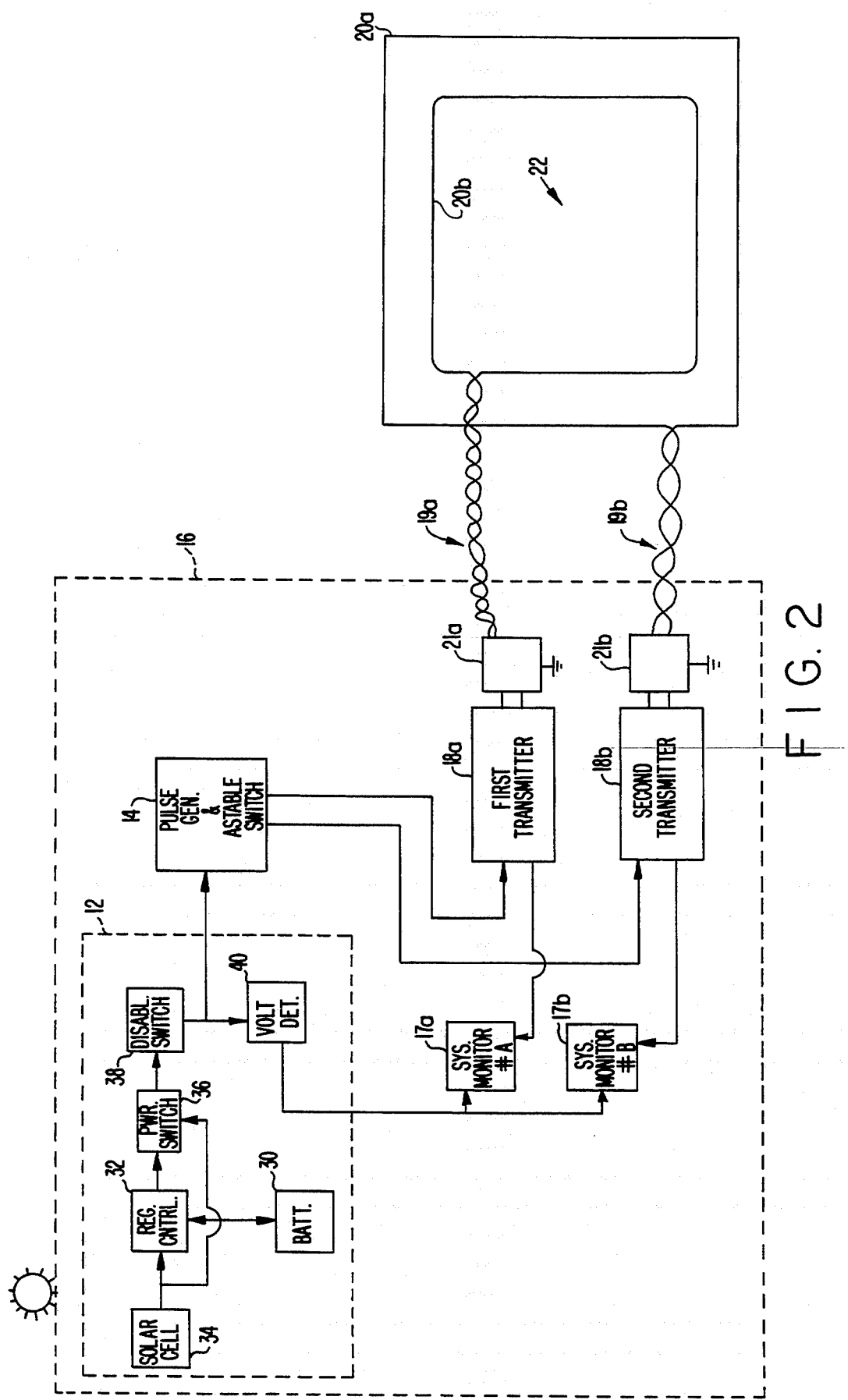
FIG. 2 is a block diagram of the antenna and signal transmission means of the present invention.

Antennas 20a,b are disposed about the boundary of the restricted area 22 and are preferably disposed below grade so that they do not interfere with golf play or maintenance activities such as the cutting of grass. In this way, a golf cart 24 cannot approach the restricted area 22 without first receiving an electromagnetic signal radiating from the outer antenna 20a. Similarly, the golf cart cannot enter into the restricted area, which is bounded by the inner antenna 20b, without next receiving an electromagnetic signal from the inner antenna. This in effect establishes two areas, a warning area about the restricted area and the restricted area. The outer and inner antennas 20a,b receive different frequency alternating signals generated by the transmitters 18a,b (as shown in FIG. 2) within transmitter housing 16.

The electromagnetic signals radiating from the outer and inner antennas 20a,b are received by the signal receiving, processing and display means 26 located on a golf cart 24. The receiving, processing and display means 26 is located on the golf cart 24 so alarm signals and information displays, representative of the position of the golf cart 24 with respect to the restricted area 22, are available for the operator of the golf cart and/or course representatives.

The signal receiving, processing and display means 26 also preferably includes an external visual alarm 46 (see discussion concerning FIG. 3) that is visible to course rangers and/or other course personnel as they patrol the course. Alternatively, the external visual alarm 46 may be a separate unit, such as a light bar mounted elsewhere on the cart. A course ranger can identify carts located in restricted areas by means of the external visual alarm 46 so appropriate action can be taken, including requesting the operator to remove the cart from the restricted area.

Figure 1B:
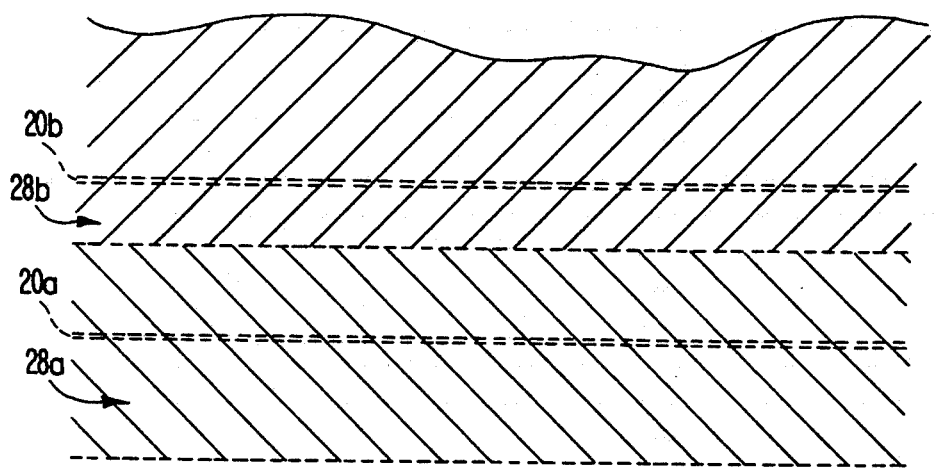
FIG. 1B is a plan view of a portion of the restricted area boundary.

A plan view of the placement of the outer and inner antennas 20a,b about the boundary of the restricted area 22 is shown in FIG 1B. The outer and inner antennas 20a,b are spaced from each other to establish a first and second alert zone 28a,b. The first alert zone 28a extends outward from the second alert zone 28b and covers the area about the restricted area 22 where a cart operator is to be given a warning that the cart is approaching a restricted area. The size of the first alert zone 28a, as seen from the example below, is dependent upon the electromagnetic signal radiating from the outer antenna 20a.

The second alert zone 28b, covers both the restricted area 22 and the area between the inner antenna 20b and the inner boundary of the first alert zone 28a. The second alert zone 28b is the zone in which a cart operator is to receive a warning that the cart is in a restricted area. The intrusion into the second alert zone 28b also causes the present invention, as discussed below in connection with FIG. 3, to accumulate information wanted by the golf course representatives concerning intrusions into the second alert zone (i.e., the restricted area) by a golf cart. The distance between the inner antenna and the first alert zone inner boundary, as seen from the example below, is dependent upon the electromagnetic signal radiating from the inner antenna 20b. In sum, the two alert zones 28a,b provide a basis for establishing different visual and auditory queues for the cart operator, as well as establishing the different monitoring criteria for the golf carts.

Preferably, the outer and inner antennas 20a,b are spaced approximately 18 feet apart. Using a 2 watt transmitter 18a radiating a 22.2 kHz signal for the outer antenna 20a, a first alert zone 28a is established that is approximately 24 feet across and which extends about 10 feet outward from the outer antenna 20a (i.e., the side furthest from the restricted area 22) and about 14 feet inward on the side closest to the inner antenna 20b. The disparity in distances is due to the effect the inner antenna 20b, has on the electromagnetic signals radiating from the outer antenna 20a.

Using a 2 watt transmitter 18b radiating a 8.75 kHz signal for the inner antenna 20b, a second alert zone 28b is established which begins approximately 4 feet from the inner antenna 20b, on the side closest to the outer antenna 20a, and extends therefrom to about 4 feet on the other side of the inner antenna 20b. The outer boundary of the second alert zone 28b is established by the electromagnetic signal radiating from the inner antenna 20b. As explained below in connection with FIG. 3, the second alert zone signal is effectively sealed in by the electronics while the golf cart remains within the second alert zone 28b and is not released until the golf cart 24 re-enters the first alert zone 28a.

A block diagram of the signal transmission means 16 and associated antennas 20a,b of the present invention is shown in FIG. 2. The signal transmission means 16 includes a power supply 12 and a pulse generator and astable switch 14 which selectively and alternatingly provides pulsed power to either transmitter 18a,b for a predetermined time period. In this way, two unique electromagnetic signals each having a finite time duration are generated asynchronously by the transmitters 18a,b.

The transmitters 18a,b, while generating separate and distinct frequency electromagnetic signals, may be housed in a common transmitter housing as the signal transmission means 16 for each restricted area. The electromagnetic signal generated by one transmitter 18a is radiated from one loop antenna, the outer antenna 20a, and the signal generated by the other transmitter 18b is radiated from the inner antenna 20b, another loop antenna. In this way, the signal radiated by the outer antenna 20a is distinguishable in frequency and time from that radiated by the inner antenna 20b. As indicated above, in one embodiment a 22.2 kHz signal is radiated from outer antenna 20a and a 8.75 kHz signal from the inner antenna 20b.

In a preferred embodiment, the power supply 12 consists of a rechargeable battery 30, a regulating and control device 32, and a solar cell 34. The power supplied to the pulse generator and astable switch 14, comes from the solar cell 34 and/or the battery 30. The solar cell 34 is also used to recharge the battery 30. The regulation and control device 32, known in the art, controls the power distribution from the battery 30 and solar cell 34, as well as charging of the battery 30.

Since golfing is normally done during daylight hours, the power supply includes a power supply control switch 36 so power is supplied to the pulse generator and astable switch 14 only when there is daylight (i.e, battery power not depleted by running the transmitters 18a,b at other times of the day). Preferably, the output from the solar cell 34 is used to control the operation of the power supply control switch 36. Alternatively, a sensor such as a photocell, timers or other means known in the art may be used to control the power supply control switch 36.

The power supply 12 also includes an off season disable switch 38 and a voltage level detector 40. The disable switch 38, which may be a mechanical type of switch, is provided so the battery can be trickle charged during the off season but preventing electromagnetic signals from being radiated. The voltage detector 40 monitors the voltage output of the power supply and provides an output signal to the output system monitors 17a,b.

A lightning arrester module 21a,b, known in the art, is electrically interconnected between each antenna 20a,b and its corresponding transmitter 18a,b. The modules 21a,b are provided to protect the antennas, the transmitters, the power supply and associated circuitry from the effects of lightning strikes. Each arrester module 21a,b is also electrical connected to ground, as is known in the art, so excess energy from the lightning strike, which could damage the above identified components, is dissipated to ground.

As discussed in more detail above in connection with FIGS. 1A, 1B, the outer and inner antennas 20a,20b are located about a course restricted area 22 so a golf cart cannot enter the restricted area without passing through the electromagnetic fields radiating from these antennas 20a,b. The lightning module 21a,b for each transmitter 18a,b is interconnected to the corresponding antenna 20a, by means of lines 19a,b that are typically twisted so an electromagnetic signal is not radiated therefrom and a false signal provided to the signal receiving, processing and display means 26 (see FIG. 3) of the present invention.

Each transmitter 18a,b is provided with an output system monitor 17a,b to monitor the output status of each transmitter, the electrical integrity of the antenna path from each transmitter, and the power supply output voltage. The system monitors 17a,b may be any of a number of devices known in the art, however, the monitors preferably have an LCD display.

Each system monitor 17a,b provides an indication to identify when the power supply voltage, as indicated by the voltage level detector output, falls below a prespecified level. For example, to identify the low power voltage condition the LCD display is switched off. Each monitor 17a,b also provides an indication to identify when the transmitter output has fallen below a prespecified value, the transmitter has failed, or there is a break in the antenna/arrester module loop. To identify this condition, the LCD display is made to blink.

Figure 3:
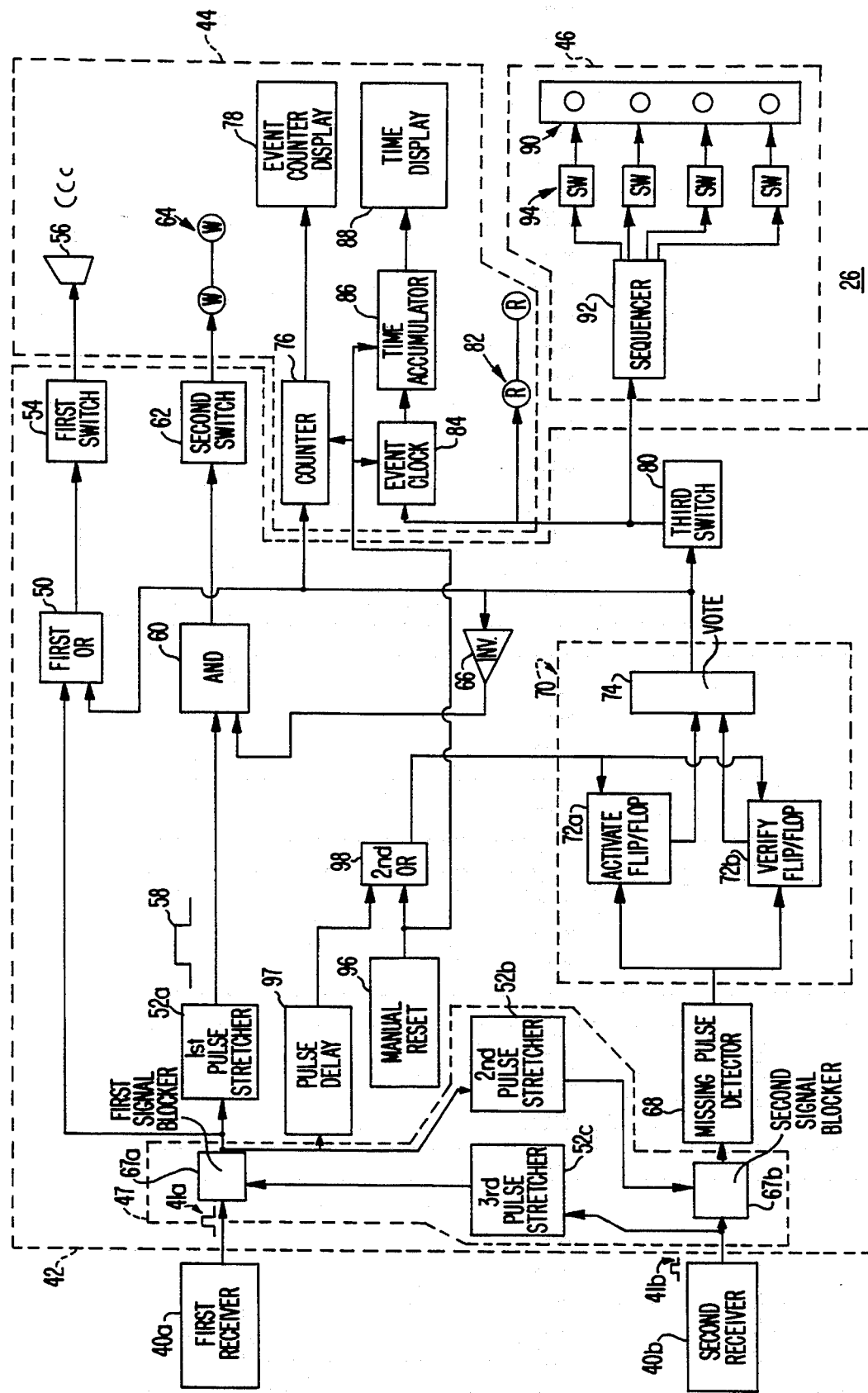
FIG. 3 is a block diagram of the electromagnetic signal receiving, processing and display means of the present invention.

As shown in FIG. 3, the signal receiving, processing and display means 26 of the present invention includes two receivers, 40a,b, a signal processing means 42, a display means 44 and an external visual alarm 46. Preferably, each receiver 40a, antenna 20a and transmitter 18a combination establishes an omni-directional antenna system that is not susceptible to angular orientation of the cart in a single plane established by the antenna.

When a golf cart is in the first alert zone 28a (see FIG. 1B), the first receiver 40a, receives the electromagnetic signals radiating from the outer antenna 20a (see FIG. 1B) and provides a pulsed output signal 41a representative thereof. As indicated above, the outer antenna signal, if received, represents a warning that a golf cart is located in the first alert zone and is approaching the restricted area. The pulsed output signal from the first receiver 40a is provided to the signal processing means 42. In response to the first receiver pulsed output signal 41a, the signal processing means 42 outputs signals to the display means 44 to actuate the visual and auditory alarms 64,56 indicating that the golf cart is in the first alert zone 28a. The following describes how the signal processing means 42 and display means 44 accomplishes this.

The first receiver pulsed output signal 41a is provided to a false signal inhibitor means 47 so that if an electromagnetic signal emanates from the inner antenna 20b but is received by the first receiver 40a, it is blocked from further processing as described below in the discussion concerning the false signal inhibitor means 47. If the signal is not blocked, the first receiver pulsed output signal 41a passes through the false signal inhibitor means 47 to a first OR gate 50, a first pulse stretcher 52a and a pulse delay 97.

The pulsed output signal 41a causes the first OR gate 50 to actuate a first switch 54 for the duration of the first receiver pulsed output signal 41a. This in turn causes the auditory alarm 56 to sound for the same duration. Since the electromagnetic signal radiated by the outer antenna 20a is a repetitive pulse, the auditory alarm 56 will provide a chirping type of sound as it is switchably turned on and off by the first switch 54 in response to the pulsed electromagnetic signal from the outer antenna 20a.

As a practical matter, the pulse width of the first receiver pulsed output signal 41a is too short in duration to generate a usable visual alarm. As such, the pulse width of the pulse output signal 41a is increased by the first pulse stretcher 52a so that the stretched pulse signal 58 can be used to generate the visual alarm.

The stretched pulsed signal 58 is provided to an AND gate 60. As explained in more detail below in connection with the operation of the second receiver 40b, an input is provided to an inverter 66 indicating when inner antenna signals are being received by the second receiver 40b. When signals are being received from the inner antenna 20b, then the inverter 66 provides an input to the AND gate 60 that effectively blocks any signal outputs from the AND gate.

If no inner antenna signals are being received, then the inverter 66 provides a permissive input to the AND gate 60 so the AND gate 60 will provide an output when it receives the stretched pulse signal 58. The output signal from the AND gate 60 controls a second switch 62 so the first visual alarm 64 is actuated (i.e., lit) for as long as a stretched pulse signal 58 is present. Alternatively, other gating schemes known on the art can also be used to perform the above functions.

since the stretched pulse signal 58 has a finite duration and is repetitively generated, the first visual alarm will flash on and off. The visual alarm's "on" duration is dependent upon how much the pulse width has been increased by the first pulse stretcher 52a. Preferably, the pulse width of the stretched pulse signal is established so the first visual alarm 64 is lit or on for approximately 70 milliseconds during each cycle. Alternatively, the duration of the pulse can be increased to be greater than the repetition rate of its input signal so that the first visual alarm 64 remains on in lieu of flashing.

When a golf cart enters the second alert zone 28b, the second receiver 40b receives the electromagnetic signal radiating from the inner antenna 20b and provides a representative pulsed output signal 41b. As explained above, the false signal inhibitor means 47 within the signal processing means 42 upon receiving a signal from the inner antenna 20b effectively blocks any outer antenna signals, that might be received concurrently by the first receiver 40a, from actuating the first visual alarm 64. The visual and auditory alarms of the display means 44 are changed, responsive to the signal processing means 42, to indicate that the cart is in the second alert zone 28b. In addition, the event counter 76, the event time accumulator 78, and the external visual alarm 46 are actuated when the cart enters the second alert zone 28b. The following describes the forgoing functions of the signal processing means 42, the display means 44 and the external visual alarm 46 in more detail.

The second receiver pulsed output signal 41b is also provided to the false signal inhibitor means 47, but to block second receiver output signals that are not first proceeded, as discussed below, by a valid first receiver pulsed output signal 41a. If the signal is not blocked, then the second receiver pulsed output signal 41b passes through the false signal inhibitor means 47 to a missing pulse detector 68 of the signal processing means 42. The missing pulse detector 68 provides a continuous output signal to a resettable signal sealing means 70 for as long it receives a string of pulse signals at predetermined intervals from second receiver 40b that are coming from the inner antenna 20b. The missing pulse detector's 68 continuous output assures that the signal sealing means 70 will not be reset if the first receiver 40a receives signals from the outer antenna 20a while the cart is located in the second alert zone 28b. When the cart exits the second alert zone 28b (i.e., no longer receiving inner antenna signals), the missing pulse detector will turn off which terminates the detector's output signal to the signal sealing means 70.

The signal sealing means 70 seals or latches in an output signal (i.e., a continuous output signal) to the display means 44, the inverter 66 and the external visual alarm 46, when there is output signal from the missing pulse detector 68 representative of the receipt of a valid string of electromagnetic pulses from the inner antenna 20b. The output signal from the signal sealing means 70 is maintained for as long as the cart is located within the second alert zone 28b. When the cart exits the second alert zone 28b and enters the first alert zone 28a, the signal sealing means 70 is reset as described below.

In a preferred embodiment, the signal sealing means 70 consists of two flip/flops 72a,b in parallel and a voting unit 74. The flip-flops 72a,b may be J-K master/slave flip-flops and the voting unit may be an AND circuit. The two flip-flops 72a,b both receive the continuous output signal from the missing pulse detector 68. The missing pulse detector's 68 output signal causes the output of both flip-flops 72a,b to go high (i.e., "set" flip-flops). The flip-flops' output remains high while the cart is in the second alert zone 28b (FIG. 1B) and until it leaves the second alert zone and enters the first alert zone 28a at which point the flip-flops 72a,b are reset as described below.

A voting unit 74 continuously monitors the outputs of both flip-flops 72a,b to determine the presence of valid second receiver pulse signals 41b. Valid signals are considered present when both outputs of the flip-flops 72a,b are high (i.e, both flip-flops are set). If the output of either or both flip-flops is low, then valid signals are not considered present. The redundancy of flip-flops provides a measure of assurance that a spurious activation of a single flip-flop will not actuate the display means functions associated with the second alert zone 28b and the external visual alarm 46. When valid signals are present, the voting unit 74 outputs a continuous signal to the first OR gate 50, the inverter 66, the event counter 76 and a third switch 80. The voting unit output signal continues until either or both of the flip-flop outputs go low (i.e., until flip-flops 72a,b are reset).

The voting unit 74 provides a continuous output signal to the first OR gate 50, which controls the actuation of the auditory alarm 56 as discussed above, so another auditory alarm is sounded when the golf cart enters the second alert zone 28b. The auditory signal produced by the auditory alarm 56 when it is receiving a voting unit signal, however, is continuous and distinctive from the auditory signal generated when the cart enters the first alert zone 28a. It should be recognized that the auditory alarms for the first and second alert zones 28a,b are not limited to that described above. The auditory alarms may be of any style and duration as long as the alarms for the two alert zones are distinguishable from one another.

As provided above, the inverter 66 controls the operation of the AND gate 60 used to switchably control the first visual alarm 64. When the voting unit 74 provides an output signal representative of the presence of valid second receiver pulse signals 41b, the inverter 66 provides the output required to block any signal outputs from the AND gate 60. In this way, the first visual alarm does not actuate (i.e., light up) when the cart enters the second alert zone even if valid electromagnetic signals are still being received from the outer antenna 20a (see FIG. 1B). This blocking signal from the inverter 66 remains until the cart has exited the second alert zone 28b and enters the first alert zone 28a.

Upon the receipt of an output signal from the voting unit 74, the event counter 76 is incremented by one. The event counter 76 continues to increment by one each time a cart crosses into the second alert zone 28b from the first alert zone 28a. As such the event counter 76 contains a running total of the number of times a cart has entered into the second alert zone 28b (i.e., the restricted area). The event counter display 78 of the display means 44 reflects the count stored in the event counter and is updated each time the event counter 76 is incremented. As such, the total number of times a cart has entered into a restricted area (i.e., the second alert zone 28b), during a game or the use of cart, is continuously displayed for the cart operator's information. In addition, this information is available to the course representatives during or after a game so that appropriate action can be taken to hold the cart operator accountable for the intrusion into restricted areas.

The voting unit output signal is provided to a third switch 80 that controls the actuation of the second visual alarm 82, the event clock 84, and the external visual alarm 46. Upon receipt of this signal, the third switch 80 actuates a second visual alarm 82 that is distinctive from the first visual alarm 64. Preferably, the first and second visual alarms 64,82 have a distinctive color (e.g., white and red lights). Since the voting unit signal is continuous, the second visual alarm 82 is also continuous which is different from the flashing first visual alarm 64. Alternatively, the first and second visual alarms may both flash or both may stay lit continuously as long as visual alarms, including any prescriptive message (see FIG. 4 discussion), are distinguishable from each other.

The event clock 84 is started by the third switch 80, upon receipt of the voting unit signal. The clock continues to run as long as the cart is located within the second alert zone 28b (i.e., within the restricted area). When the cart exits the second alert zone 28b and the voting unit signal stops, the third switch 80 switches to stop the clock. The time accumulator 86 monitors the clock 84 and increments by 0.1 for the passage of every 6 seconds of the clock. The time accumulator 86 maintains a running total of the amount of time a cart has been located in the restricted areas of a golf course.

The time display 88 reflects the total amount of time contained in the time accumulator 86 and is updated each time the time accumulator 86 is incremented. As such, the total amount of time the cart has been in restricted areas (i.e., the second alert zone 28b) is continuously displayed for the cart operator's information. In addition, this information is available to course representatives during or after a game so that appropriate action can be taken to hold the cart operator accountable for the intrusion into the restricted areas.

The external visual alarm 46 is actuated by the third switch 80 so course rangers can easily identify carts which are located in restricted areas (i.e., second alert zone). Preferably, the external visual alarm 46 consists of a plurality of lights 90 which are lighted sequentially by means of a sequencer 92. The sequencer 92 controls a plurality of switches 94, switchably connected to the lights, so the lights 90 are sequentially energized. Alternatively, any means known in the art for generating a visual external alarm (e.g., a strobe colored light) may be used.

The flip-flops 72a,b, which are set upon entering the second alert zone 28b, are reset automatically when the cart exits the second alert zone 28b and enters the first alert zone 28a (i.e., no signals being received by second receiver and signals being received by first receiver). As indicated above, the resetting of the flip-flops will stop the event clock 84, change the auditory and visual alarms representative of the location of the cart and stop the external visual alarm 46.

The first receiver pulsed output signal 41a that passes through the false signal inhibitor means 47 is used to reset the flip-flops 72a,b. The first receiver output signal, however, is time delayed by a pulse delay 97 to account for the asynchronous transmission of signals by the outer and inner antennas 20a,b. The pulse delay 97 delays the first receiver output signal 41a so that it is provided to the flip-flops in time after the expected time for the transmission of a signal from the inner antenna 20b. In this way, the missing pulse detector 68 holds the flip-flops in the set state when the first receiver 40a, begins to receive outer antenna signals while the cart is located in the second alert zone 28b. When the cart exits the second alert zone 28b, the continuous signal from the missing pulse detector 68 will stop, which allows the flip-flops 72a,b to be reset by a delayed first receiver pulse output signal.

A manual reset 96 is also provided so a cart can be used again and again while providing the necessary monitoring information for each operator of the cart. The manual reset is electrically interconnected to the event counter 76, the event clock 84, and the time accumulator 86 so that when the manual reset is actuated these components are initialized (e.g., the event counter reset to zero). The manual reset 96 is also electrically interconnected to the second OR gate 98 so that when the manual reset 96 is actuated the flip-flops 72a,b will receive a reset signal from the second OR gate. This provides a means for resetting the flip-flops 72a,b in the event that they become erroneously locked in the set or on state (e.g., not reset by first receiver output signals).

Because of transmitter/antenna characteristics, signal harmonics, and the bandwidth characteristic of a given receiver, it may be possible for a receiver, configured to receive signals at one frequency, to receive an electromagnetic signal that is emanating from an antenna which is configured to radiate a different frequency signal. Also, since the signal sealing means 70 is reset by valid first receiver output signals the failure of the first transmitter 18a, the outer antenna 20a, or the first receiver 40a, could create a situation where a cart would become a general nuisance when it exits the second alert zone 28b. The false signal inhibitor means 47 includes a first and second signal blocker 67a,b and a second and third pulse stretcher 52b,c to address these concerns as described below.

The first signal blocker 67a receives the output from the first receiver 40a and a stretched pulse signal from the third pulse stretcher 52c representative of signals being received by the second receiver 40b. The first signal blocker 67a determines whether the output from the first receiver 40a is concurrent in time with the third pulse stretcher's stretched output signal. If the the output from the first receiver 40a is concurrent with the third stretched pulse output signal (i.e., the outputs of the first and second receiver's are concurrent), then the first signal blocker 67a blocks the output signal from the first receiver so that the signal is not processed further. If the first receiver output signal is not concurrent then the the signal is passed through the first signal blocker as described above. In this way, the first signal blocker can block the transmission of signals emanating from the inner antenna 20b but being received by the first receiver 40a.

The third pulse stretcher 52c is provided because, while the signals to the first and second receivers 40a,b are essentially transmitted concurrently, the shape of the curve for the signals as well as other characteristics of the receivers may create a situation where a false signal could be generated because the signal being received by the first receiver 40a has a longer duration than the signal being received by the second receiver 40b. The pulsed output from the second receiver 40b is stretched by the third pulse stretcher 52c so that the duration of the stretched pulse signal will exceed the duration of a false signal to the first receiver 40a but not overlap the transmission of a signal from the outer antenna 20a. For example, if an antenna transmitted signal has a duration of 20 milliseconds and the time separation between valid signal from the outer and inner antennas 20a,b is 100 milliseconds, then the third pulse stretcher 52c would stretch the second receiver output signal so that the stretched signal has a duration of 50 milliseconds.

The second signal blocker 67b receives the output from the second receiver 40b and a stretched pulse signal from the output of the second pulse stretcher 52b representative of signals being received by the first receiver 40a. The purpose of this circuit is to assure that the second receiver output signals are not provided to the missing pulse detector 68 for processing unless the receipt of a signal by the second receiver 40b is preceded by the receipt of a valid signal by the first receiver 40a. In this way, signals representative of a cart being located in the second alert zone 28b are not considered valid if the system has not first received signals indicating that the cart has passed through the first alert zone 28a. Valid signals are passed to the missing pulse detector 68 to set the signal sealing means 70 as described above.

In a preferred embodiment, the second signal blocker 67b is configured to normally block all signals coming from the second receiver 40b. The second signal blocker 67b passes signals only when the signals from the second receiver 40b are concurrently received with a stretched output signal from the second pulse stretcher 52b. That is a second receiver output signal 41b concurrently received with a second pulse stretcher output signal is considered to be a valid second receiver output signal 41b by the second signal blocker 47. All other signals from the second receiver 40b are considered invalid even those coming from the inner antenna 20b.

The second pulse stretcher 52b takes the first receiver pulsed output signal 41a and stretches it so that the duration of the stretched pulse overlaps in time the expected time of the repetitive transmission from the inner antenna 20b. In the present invention, the pulse width of the first receiver pulsed output signal is stretched so that it has a duration greater than 60% and less than 90% of the repetition rate of the pulses transmitted from the outer antenna 20a. The second signal blocker 67b and second pulse stretcher 52b may be any of a number of circuits in the art that can perform the above described functions.

Figure 4:
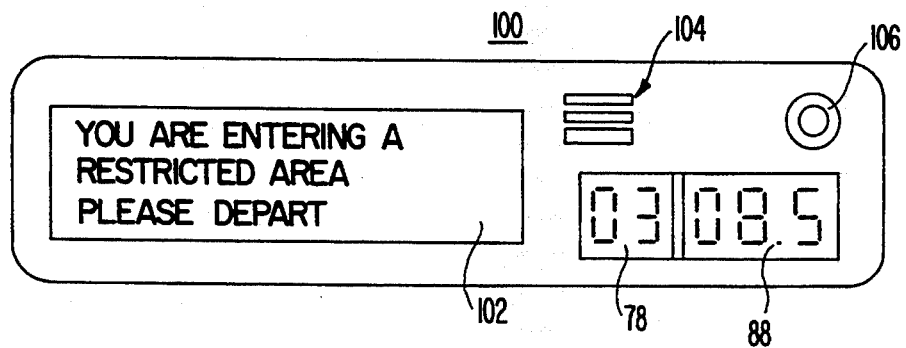
FIG. 4 is a an elevation view of the information display provided by the signal receiving, processing and display means of the present invention.

There is shown in FIG. 4 an elevation view of the information display 100 provided by the signal receiving, processing and display means 26 located on a golf cart 24 (FIG. 1A). The informational display 100 includes a message display 102 that contains a pre-scripted message such as "YOU ARE ENTERING A RESTRICTED AREA-PLEASE DEPART." Preferably, the message display is illuminated by either the first or second visual alarm 64,82 (FIG. 3) of the present invention depending upon the location of the cart with respect to the first and second alert zones 28a,b. For example, when the cart is located in the first alert zone 28a, the message display 102 is illuminated by a flashing white light and when in the second alert zone 28b, the message display 102 is illuminated with a steady red light.

Alternatively, the message display 102, contains two pre-scripted messages. The first message is "YOU ARE ENTERING A RESTRICTED AREA-PLEASE DEPART" and the second is "YOU ARE IN A RESTRICTED AREA-DEPART AT ONCE." In this embodiment, the first message is illuminated by the first visual alarm 64 (FIG. 3) and the second message is illuminated by the second visual alarm 82. In this way, an operator is provided with a unique visual alarm and a unique informative pre-scripted message for each of the alert zones 28a,b.

The information display 100 contains a two digit event counter display 78 (see FIG. 3) that indicates the number of times a golf cart has entered into restricted areas (i.e., second alert zone) during a game. The information display 100 also contains a three digit time display 88 (see FIG. 3) that indicates the total amount of time a cart has been located in restricted areas during a game. In the illustrated example, a cart has entered restricted areas three times and has been in these areas for a total of 8.5 minutes. While two and three digit display are illustrated, this is not a limitation as the displays may have more or less digits as the actual needs may require. It should be recognized that it is well within the skill of those in the art to adapt other types of displays, for example an LCD display, for use in the subject invention.

A plurality of slit apertures 104 may be provided in the information display 100, to permit the passage of the auditory signal from the auditory alarm 56. The information display may also contain a lockable switch 106, as is known in the art, for use by course representatives to manually reset the signal processing means 42 and display means 44 of the present invention as explained above in conjunction with FIG. 3. In this way, a course representative can reset a cart's signal receiving, processing and display means 26 so the cart can be used by another operator and so the information displayed in the event counter display 78 and the time display 88 reflects the use of the cart by that operator.

Figure 5:
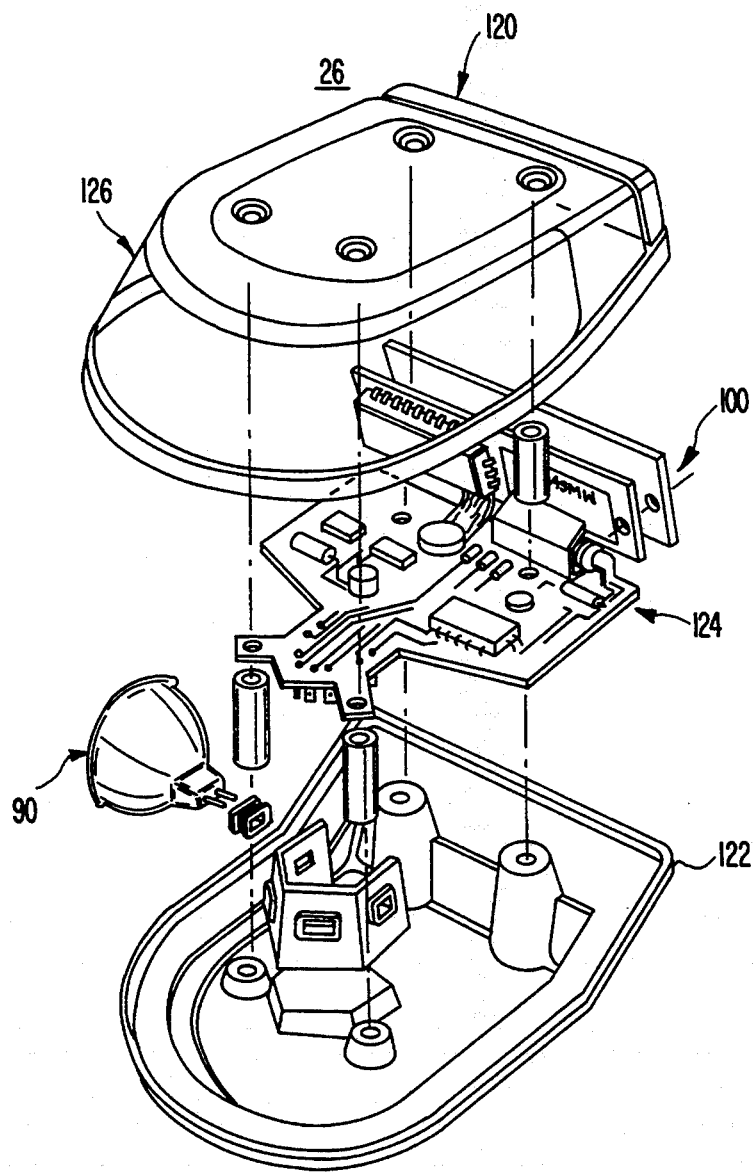
FIG. 5 is an exploded axonometric view of the electromagnetic signal receiving, processing and display means and it associated housing.

An exploded view of an embodiment of the signal processing and display means 26 including the associated housing, is shown in FIG. 5. The signal processing and display means 26 includes an informational display 100, top and bottom housing sections 120,122, a plurality of external visual alarm lights 90 although only one light is illustrated, and an electronics package 124 containing the circuits described above in connection with FIG. 3.

In this embodiment, the external visual alarm lights 90 are disposed opposite the informational display 100 so that the lights are not visible to the cart operator when driving the cart. When the top and bottom housing sections 120,122 are secured together, the light coming from the external visual alarm lights 90 shines through a clear portion 126 of the top housing 120 so a course ranger or representative can see the external visual alarm lights 90 when the external visual alarm 46 is activated. In this way the course ranger or representative can readily identify carts located within restricted areas.

While a preferred embodiment of the invention has been described using specific terms, such description is for illustrative purposes only, and it is to be understood that changes and variations may be made without departing from the spirit or scope of the following claims.

What is claimed is:

1. A golf cart control and monitoring apparatus, comprising:

first and second antennas spaced from each other, said first and second antennas each being disposed about at least one restricted area of a golf course, where said first antenna is disposed outside of said second antenna;

transmitter means for transmitting both a first electromagnetic signal from said first antenna and a second electromagnetic signal from said second antenna;

receiver means for both receiving said first and second electromagnetic signals and providing first and second outputs representative thereof;

first alarm means, responsive to said first output from said receiver means, for generating a first alarm indicating that a golf cart is approaching any one of the at least one restricted area;

second alarm means, responsive to said second output from said receiver means, for generating a second alarm indicating that the golf cart has entered any one of the at least one restricted area;

event log means, responsive to both said first and second outputs, for generating a cumulative historical log of how many times and for how long the golf cart has been located within any of the at least one restricted area, wherein said event log means, said receiver means, said first alarm means and said second alarm means are disposed on the golf cart.

2. The golf cart control and monitoring apparatus of claim 1 wherein said event log means begins to accumulate data upon receipt of said second output and terminates data accumulation upon loss of said second output and receipt of said first output, and wherein said second alarm means generates an alarm that is distinct from that generated by said first alarm means.

3. The golf cart control and monitoring apparatus of claim 2 in which said event log means includes:
an event counter, responsive to said second output from said receiver means, for counting each time the golf cart has entered into any of the at least one restricted area; and
time accumulation means, responsive to said second output from said receiver means, for determining the cumulative amount of time the golf cart has been located in any of the at least one restricted area.

4. The golf cart control and monitoring apparatus of claim 3 in which said event log means further includes:
an event display, responsive to said event counter, that provides a visual display to an operator of the golf cart of the total number of entries into any of the at least one restricted area; and
a time display, responsive to said time accumulation means, that provides a visual display to the golf cart operator of the cumulative time.

5. The golf cart control and monitoring apparatus of claim 4 in which said receiver means includes a signal sealing means for sealing in said second output from said receiver means until said receiver means is receiving said first electromagnetic signal and not receiving said second electromagnetic signal.

6. The golf cart control and monitoring apparatus of claim 2 in which said transmitter means includes a first transmitter for generating said first electromagnetic signal, and a second transmitter for generating said second electromagnetic signal.

7. The golf cart control and monitoring apparatus of claim 6 in which said transmitter means further includes:
switching means for selectively switching said first and said second transmitters for selectively transmitting said first and said second electromagnetic signals; and
an electrical power supply for energizing said first and said second transmitters, wherein said switching means is disposed between said power supply and said first and second transmitters such that said first and second transmitters are selectively energized by said power supply.

8. The golf cart control and monitoring apparatus of claim 7 wherein said electrical power supply includes a solar power cell.

9. The golf cart control and monitoring apparatus of claim 2 in which said receiver means includes a first receiver for receiving said first electromagnetic signal, wherein said first receiver provides said first output representative of said first electromagnetic signal, and a second receiver for receiving said second electromagnetic signal, wherein said second receiver provides said second output representative of said second electromagnetic signal.

10. The golf cart control and monitoring apparatus of claim 9 in which said first alarm means includes:
pulse stretch means for both lengthening the pulse width of said first output from said first receiver and generating a stretched pulse signal representative thereof;
visual alarm means, responsive to said stretched pulse signal, for generating a first visual alarm; and
auditory alarm means, responsive to said first output from said receiver, for generating a first auditory alarm.

11. The golf cart control and monitoring apparatus of claim 9 further comprising false signal inhibitor means for blocking output from said first and said second receivers from being processed further when prespecified conditions are met.

12. The golf cart control and monitoring apparatus of claim 11 wherein output from said first receiver is blocked when the outputs from said first and said second receiver are coincident in time and wherein output from said second receiver is blocked if the second receiver output is not preceded by an output from said first receiver.

13. The golf cart control and monitoring apparatus of claim 2 in which said first alarm means includes means for generating a first visual alarm and a first auditory alarm and in which said second alarm means includes means for generating a second visual alarm and a second auditory alarm.

14. The golf cart control and monitoring apparatus of claim 13 wherein said second auditory alarm is distinct from said first auditory alarm and wherein said second visual alarm is distinct from said first visual alarm.

15. The golf cart control and monitoring apparatus of claim 14 further including alarm blocking means for blocking said first visual alarm when said receiver means is receiving said second electromagnetic signal from said second antenna.

16. The golf cart control and monitoring apparatus of claim 2 further including a pre-scripted message display that displays a pre-scripted message selected from among at least one available pre-scripted message, the displayed message advising a golf cart operator of the cart's location with respect to any of the at least one restricted area.

17. The golf cart control and monitoring apparatus of claim 2, further including an external visual warning means, responsive to said second output from said receiver means, for generating a visual signal that is visible to golf course representatives at other locations on the golf course.

18. The golf cart control and monitoring apparatus of claim 2 wherein said first and second antennas are disposed so as to be spaced 18 feet apart from each other.

19. The golf cart control and monitoring apparatus of claim 18 wherein said first and second antennas are disposed below grade.

20. The golf cart control and monitoring apparatus of claim 2 wherein said transmitter means includes a lightning protection device that protects both said transmitter means and said first and second antennas from the effects of lightning strikes.

21. A golf cart control and monitoring apparatus, comprising:
   first and second antennas spaced from each other, said first and second antennas each being disposed about at least one restricted area of a golf course, where said first antenna is disposed outside of said second antenna;
   a first transmitter means for transmitting a first electromagnetic signal from said first antenna;
   a second transmitter means for transmitting a second electromagnetic signal from said second antenna;
   a first receiver means for both receiving said first electromagnetic signal and providing a first output representative thereof;
   a second receiver means for both receiving said second electromagnetic signal and providing a second output representative thereof;
   first alarm means, responsive to said first output from said first receiver means, for generating a first alarm indicating that a golf cart is approaching any one of the at least one restricted area;
   second alarm means, responsive to said second output from said second receiver means, for generating a second alarm indicating that the golf cart has entered any one of the at least one restricted area, wherein said second alarm means generates an alarm that is distinct from that generated by said first alarm means;
   an event counter means, responsive to said second output from said second receiver means, for counting each time the golf cart has entered any of the at least one restricted area;
   time accumulation means, responsive to both said first and second outputs, for determining the cumulative amount of time the golf cart has been located in any of the at least one restricted area, wherein said time accumulation means begins to accumulate data upon receipt of said second output and stops data accumulation upon loss of said second output and receipt of said first output; and
   display means, responsive to said time accumulation means and said event counter means, for both displaying the total number of entries into any of the at least one restricted area and displaying the cumulative time, wherein said display means, said first and second receiver means, said event counter means, said first and second alarm means and said time accumulation means are disposed on the golf cart.

22. The golf cart control and monitoring apparatus of claim 21 in which said second receiver means includes a signal sealing means for sealing in said second output from said second receiver means until said first receiver means is receiving a first electromagnetic signal and said second receiver means is not receiving said second electromagnetic signal.

23. The golf cart control and monitoring apparatus of claim 22 further comprising:
   switching means for selectively switching said first and said second transmitters for selectively transmitting said first and said second electromagnetic signals; and
   an electrical power supply for energizing said first and said second transmitter means, wherein said switching means is disposed electrically between said power supply and said first and second transmitters such that said first and second transmitters are selectively energized by said power supply.

24. The golf cart control and monitoring apparatus of claim 23 in which said first alarm means includes:
   pulse stretch means for both lengthening the pulse width of said first output from said first receiver means and generating a stretched pulse signal representative thereof;
   a first visual alarm, responsive to said stretched pulse signal; and
   a first auditory alarm means, responsive to said first output from said receiver means.

25. The golf cart control and monitoring apparatus of claim 24 further comprising blocking means for blocking said first visual alarm when said second receiver means is receiving said second electromagnetic signal from said second antenna.

26. The golf cart control and monitoring apparatus of claim 23 wherein said electrical power supply further includes a solar power cell.

27. The golf cart control and monitoring apparatus of claim 21, further comprising an external visual warning means, responsive to said second output from said second receiver means, for generating a visual signal that is visible to golf course representatives at other locations on the golf course.

28. The golf cart control and monitoring apparatus of claim 27 wherein said first and second antennas are disposed so as to be spaced 18 feet apart from each other.

29. The golf cart control and monitoring apparatus of claim 28 wherein said first and second antennas are disposed below grade.

30. The golf cart control and monitoring apparatus of claim 18 wherein said display means includes a pre-scripted message display that displays a pre-scripted message selected from among at least one available pre-scripted message, the displayed message advising a golf cart operator of the cart's location with respect to any of the at least one restricted area.

31. The golf cart control and monitoring apparatus of claim 21 further comprising false signal inhibitor means for blocking output from said first and said second receiver means from being processed further when pre-specified conditions are met.

32. The golf cart control and monitoring apparatus of claim 31 wherein said false signal inhibitor means blocks output from said first receiver means when the outputs from said first and said second receiver means are coincident in time and wherein said false signal inhibitor means blocks output from said second receiver means when the second receiver means output is not preceded by an output from said first receiver means.

33. The golf cart control and monitoring apparatus of claim 18 further comprising a first lightning protection device interconnected to said first transmitter means and said first antenna and a second lightning protection device interconnected to said second transmitter means and said second antenna, wherein said first and second lightning protection devices protect said first and second transmitter means and said first and second antennas from the effects of lightning strikes.

34. A golf cart control and monitoring apparatus, comprising:
   signal transmitting means for generating a plurality of signals, each signal generated being representative of a position with respect to each of at least one restricted area of a golf course;
   receiver means, disposed on a golf cart, for receiving said plurality of signals and for generating an output signal for each of said plurality of signals, wherein each said receiver means output signal is representative of the position of the golf cart with respect to any one of the at least one restricted area where at least one of said receiver means output signals indicates that the golf cart is located within any one of the at least one restricted area; and
   event log means, responsive to said receiver means output signals, for generating a historical log of how many times the golf cart has been located within any one of the at least one golf course restricted area, wherein said event log means is disposed on the golf cart.

35. The golf cart control and monitoring apparatus of claim 34, wherein said event log means generates a cumulative historical log of how long the golf cart has been located in any of the at least one golf course restricted area.

36. The golf cart control and monitoring apparatus of claim 35, in which said event log means includes:
   an event counter, responsive to said receiver means output signals, for counting each time the golf cart has entered into any of the at least one golf course restricted area; and
   time accumulation means, responsive to said receiver means output signals, for determining the cumulative amount of time the golf cart has been located in any of the at least one restricted area.

37. The golf cart control and monitoring apparatus of claim 36, in which said event log means further includes:
   an event display, responsive to said event counter, that provides a visual display to a golf cart operator of the total number of entries into any of the at least one restricted area; and
   a time display, responsive to said time accumulation means, that provides a visual display to the golf cart operator of the cumulative time.

38. The golf cart control and monitoring apparatus of claim 35, wherein said receiver means generates a first output signal to indicate that the golf cart is approaching any one of the at least one restricted area of a golf course and generates a second output signal to indicate that the golf cart has entered any one of the at least one restricted area, and wherein said event log means begins to accumulate data upon receipt of said second output signal.

39. The golf cart control and monitoring apparatus of claim 38, wherein said event log means terminates data accumulation upon loss of said second output signal and upon receipt of said first output signal.

40. The golf cart control and monitoring apparatus of claim 38, wherein said signal transmitting means includes first and second antennas spaced from each other, said first and second antennas each being disposed about the at least one restricted area of a golf course, where said first antenna is disposed outside of said second antenna; wherein said signal transmitting means transmits a first electromagnetic signal from said first antenna and a second electromagnetic signal from said second antenna, where said first and said second electromagnetic signals are each representative of a position with respect to each of the at least one restricted area of a golf course; and wherein said receiver means outputs said first output signal in response to said first electromagnetic signal and outputs said second output signal in response to said second electromagnetic signal.

41. The golf cart control and monitoring apparatus of claim 40, wherein said receiver means includes a signal sealing means for sealing in said receiver means second output signal until said receiver means is receiving said first electromagnetic signal and not receiving said second electromagnetic signal.

42. The golf cart control and monitoring apparatus of claim 40, wherein said receiver means includes a first receiver for receiving said first electromagnetic signal and a second receiver for receiving said second electromagnetic signal.

43. The golf cart control and monitoring apparatus of claim 40, wherein said signal transmitting means further includes a first transmitter for generating said first electromagnetic signal, and a second transmitter for generating said second electromagnetic signal.

44. The golf cart control and monitoring apparatus of claim 43, wherein said signal transmitting means further includes:
   an electrical power supply; and
   switching means for repetitively selectively interconnecting said power supply to said first and second transmitters so said first and said second electromagnetic signals are repetitively selectively transmitted.

45. The golf cart control and monitoring apparatus of claim 40, wherein said first and said second antennas are disposed below grade.

46. The golf cart control and monitoring apparatus of claim 34, in which said apparatus further includes an external visual warning means, disposed on the golf cart, for, generating a visual signal, visible to golf course representatives at other locations on the golf course, to indicate the position of the golf cart with respect to any one of the at least one restricted area, wherein said external visual warning means is activated responsive to the at least one of said receiver means output signals indicating that the golf cart is located within any one of the at least one restricted area of the golf course.

47. The golf cart control and monitoring apparatus of claim 34, in which said apparatus further includes a display means, disposed on the golf cart, for displaying a prescripted message selected from among at least one available prescripted message, the displayed message advising a golf cart operator of the cart's location with respect to any one of the at least one restricted area, wherein said display means further includes message determining means, responsive to said receiver means output signals, for determining the pre-scripted message to be displayed.

48. The golf cart control and monitoring apparatus of claim 34, in which said apparatus further includes a solar electrical power supply means for providing electrical power from ambient light to energize said signal transmitting means, wherein said solar electrical power supply means includes a solar power cell to generate electrical power from the ambient light incident upon said solar power cell.

49. The golf cart control and monitoring apparatus of claim 48, wherein said solar electrical power supply means further includes a power control means for regulating and controlling the electrical power from said solar electrical power supply means to said signal transmitting means.

50. The golf cart control and monitoring apparatus of claim 49, wherein said solar electrical power supply means further includes a battery and wherein said power control means regulates and controls the electrical power being supplied by said battery and said solar cell and wherein said power control means also controls charging of said battery by said solar cell.

51. The golf cart control and monitoring apparatus of claim 49, wherein said solar electrical power supply means further includes means for determining when to electrically interconnect said signal transmitting means to said electrical power supply means and switch means, responsive to said determining means, for switchably interconnecting said solar electrical power supply means and said signal transmitting means, wherein an interconnection is made at times when golf is to be played during a day.

52. The golf cart control and monitoring apparatus of claim 51, wherein said determining means further includes a light detection means for detecting ambient light and wherein said switch means interconnects said power supply means and said signal transmitting means when the ambient light detected exceeds a prespecified value.

53. The golf cart control and monitoring apparatus of claim 51, wherein said solar electrical power supply means further includes a power disable switch for disconnecting said signal transmitting means from said solar electrical power supply means.

54. The golf cart control and monitoring apparatus of claim 48, wherein said signal transmitting means includes:
first and second antennas spaced from each other, said first and second antennas each being disposed about at least one restricted area of the golf course, where said first antenna is disposed outside of said second antenna;
a first transmitter for generating a first electromagnetic signal where the first electromagnetic signal is transmitted from said first antenna; and
a second transmitter for generating a second electromagnetic signal, where the second electromagnetic signal is transmitted from said second antenna.

55. The golf cart control and monitoring apparatus of claim 54, wherein said signal transmitting means further includes switch means for selectively and repetitively electrically interconnecting said solar electrical power supply means to said first and said second transmitters so said first and said second electromagnetic signals are selectively and repetitively transmitted.

56. The golf cart control and monitoring apparatus of claim 54, wherein said first and said second antennas are disposed below grade.

57. A golf cart control and monitoring apparatus, comprising:
first and second antennas spaced from each other, said first and second antennas each being disposed about at least one restricted area of a golf course, where said first antenna is disposed outside of said second antenna;
a first transmitter means for transmitting a first electromagnetic signal from said first antenna;
a second transmitter means for transmitting a second electromagnetic signal from said second antenna;
a first receiver means for both receiving said first electromagnetic signal and providing a first output signal representative thereof;
a second receiver means for both receiving said second electromagnetic signal and providing a second output signal representative thereof, where said second output signal indicates hat a golf cart has entered any one of the at least one restricted area; and
an external visual warning means for generating a visual signal that is visible to golf course representatives at other locations on the golf course, wherein the visual signal is generated by said external visual warning means responsive to said second output signal.

58. The golf cart control and monitoring apparatus of claim 57, wherein said first output signal indicates that the golf cart is approaching any one of the at least one restricted area.

59. The golf cart control and monitoring apparatus of claim 58, wherein the visual signal is terminated when said first receiver means is generating said first output signal and said second receiver means is not generating said second output signal.

60. The golf cart control and monitoring apparatus of claim 57, wherein said external visual warning means includes a plurality of lights.

61. The golf cart control and monitoring apparatus of claim 60, wherein said external visual warning means further includes a sequencer that controls the lighting of said plurality of lights.

62. The golf cart control and monitoring apparatus of claim 61, wherein said external visual warning means further includes a plurality of switches, controlled by said sequencer, for switchably and selectively energizing each of said plurality of lights so that said lights are sequentially and repetitively lit.

63. The golf cart control and monitoring apparatus of claim 57, wherein said first and second receiver means and said external visual warning means are contained in a single housing.

64. The golf cart control and monitoring apparatus of claim 57, wherein said first and said second antennas are disposed below grade.

65. The golf cart control and monitoring apparatus of claim 57, in which said apparatus further includes an event log means, disposed on the golf cart and being responsive to said first and second output signals, for generating a historical log of how many times and for how long the golf cart has been located within any of the at least one restricted area of a golf course, wherein said event log means includes:
(i) means, responsive to said first and second output signals, for counting each time the golf cart has entered into any of the at least one restricted area and for providing a visual display to a golf cart operator of the total number of entries into any of the at least one restricted area; and
(ii) means, responsive to said first and second output signals, for determining the cumulative amount of time the golf cart has been located in any of the at least one restricted area and for providing a visual display to the golf cart operator of the cumulative time.

66. The golf cart control and monitoring apparatus of claim 65, wherein said first output signal indicates that the golf cart is approaching any one of the at least one restricted area of the golf course and wherein said event log means begins to accumulate data upon receipt of said second output signal; and wherein said event log means terminates data accumulation when said second output signal is not being outputted and when said first output signal is being outputted.

67. The golf cart control and monitoring apparatus of claim 57, in which said apparatus further includes a display means, disposed on the golf cart, for displaying a prescripted message selected from among at least one available prescripted message, the displayed message advising a golf cart operator of the cart's location with respect to any one of the at least one restricted area, wherein said display means includes message determining means, responsive to said first and second output signals, for determining the prescripted message to be displayed.

68. The golf cart control and monitoring apparatus of claim 57, in which said apparatus further includes a solar electrical power supply means for providing electrical power from ambient light to energize said signal transmitting means, wherein said solar electrical power supply means further includes a solar power cell to generate electrical power from the ambient light incident upon said solar power cell.

69. A golf cart control and monitoring apparatus, comprising:

first and second antennas spaced from each other, said first and second antennas each being disposed about at least one restricted area of a golf course, where said first antenna is disposed outside of said second antenna;

a first transmitter means for transmitting a first electromagnetic signal from said first antenna;

a second transmitter means for transmitting a second electromagnetic signal from said second antenna;

a first receiver means for both receiving said first electromagnetic signal and providing a first output signal representative thereof;

a second receiver means for both receiving said second electromagnetic signal and providing a second output signal representative thereof, where said second output signal indicates that a golf cart has entered any one of the at least one restricted area; and display means, disposed on the golf cart, for displaying a pre-scripted message selected from among at least one available pre-scripted message, the displayed message advising a golf cart operator of the cart's location with respect to any one of the at least one restricted area, wherein said display means includes message determining means, responsive to said first and second output signals, for determining the prescripted message to be displayed.

70. The golf cart control and monitoring apparatus of claim 69, wherein said first output signal indicates that the golf cart is approaching any one of the at least one restricted area and wherein said display means displays a first pre-scripted message responsive to said first output signal and displays a second pre-scripted message responsive to said second output signal.

71. The golf cart control and monitoring apparatus of claim 70, wherein said display means further includes a liquid crystal display, said liquid crystal display being responsive to said message determining means so the selected pre-scripted message is displayed.

72. The golf cart control and monitoring apparatus of claim 71, wherein said first pre-scripted message indicates that the golf cart is approaching any one of the at least one restricted area and wherein said second pre-scripted message indicates that the golf cart is in any one of the at least one restricted area.

73. The golf cart control and monitoring apparatus of claim 72, wherein said first and second pre-scripted messages include a course of action for the golf cart operator.

74. The golf cart control and monitoring apparatus of claim 71, wherein said display means further includes means, responsive to said first and second output signals, for generating auditory alarms.

75. The golf cart control and monitoring apparatus of claim 69, wherein said first and said second antennas are disposed below grade.

76. The golf cart control and monitoring apparatus of claim 66, in which said apparatus further includes an event log means, disposed on the golf cart and being responsive to said first and second output signals, for generating a historical log of how many times and for how long the golf cart has been located within any of the at least one golf course restricted area, wherein said event log means further includes:

an event counter, responsive to said second output signal, for counting each time the golf cart has entered into any of the at least one restricted area; and time accumulation means, responsive to said second output signal, for determining the cumulative amount of time the golf cart has been located in any of the at least one restricted area; and wherein said display means further includes means, responsive to said event counter and said time accumulation means, for providing a visual display of the total number of entries into any of the at least one restricted area and a visual display of the cumulative time.

77. The golf cart control and monitoring apparatus of claim 76, wherein said first output signal indicates that the golf cart is approaching any one of the at least one restricted area and wherein said event log means begins to accumulate data upon receipt of said second output signal and terminates data accumulation upon loss of said second output signal and upon receipt of said first output signal.

78. The golf cart control and monitoring apparatus of claim 69, in which said apparatus further includes a solar electrical power supply means for providing electrical power from ambient light to energize each said first and second transmitter means, wherein said solar electrical power supply means includes a solar power cell to generate electrical power from the ambient light incident upon said solar power cell.

79. The golf cart control and monitoring apparatus of claim 69, in which said apparatus further includes an external visual warning means, disposed on the golf cart, for generating a visual signal, visible to golf course representatives at other locations on the golf course, to indicate the position of a golf cart with respect to any one of the at least one restricted area, wherein the visual signal is generated by said external visual warning means responsive to said second output signal.

* * * * *

UNITED STATES PATENT AND TRADEMARK OFFICE
CERTIFICATE OF CORRECTION

PATENT NO. : 5,438,319
DATED : August 1, 1995
INVENTOR(S) : Zeytoonjian et al.

It is certified that error appears in the above-indentified patent and that said Letters Patent is hereby corrected as shown below:

Column 9, Line 1: Delete "since" and insert --Since-- therein;

Column 12, Line 40: Delete "the" (second occurrence);

Column 12, Line 47: Delete "the" (second occurrence); and

Column 24, Line 22: Delete "66" and insert --69-- therein.

Signed and Sealed this

Twenty-first Day of November, 1995

Attest:

BRUCE LEHMAN

Attesting Officer     Commissioner of Patents and Trademarks